(12) United States Patent
Choi

(10) Patent No.: US 11,618,554 B2
(45) Date of Patent: Apr. 4, 2023

(54) DRIVING APPARATUS OF FLIGHT OBJECT

(71) Applicant: Banghyen Choi, Bucheon-si (KR)

(72) Inventor: Banghyen Choi, Bucheon-si (KR)

( * ) Notice: Subject to any disclaimer, the term of this patent is extended or adjusted under 35 U.S.C. 154(b) by 216 days.

(21) Appl. No.: 17/314,350

(22) Filed: May 7, 2021

(65) Prior Publication Data

US 2022/0055738 A1 Feb. 24, 2022

(30) Foreign Application Priority Data

Aug. 19, 2020 (KR) ........................ 10-2020-0103891

(51) Int. Cl.
*B64C 23/00* (2006.01)
*H02N 2/00* (2006.01)

(52) U.S. Cl.
CPC ......... *B64C 23/005* (2013.01); *H02N 2/0005* (2013.01)

(58) Field of Classification Search
CPC ..... B64C 39/06; B64C 39/001; B64C 39/024; B64C 23/005; B64U 50/00; B64U 50/19; B64U 10/13; B64D 27/24; H02N 2/0005; Y02T 50/60
See application file for complete search history.

(56) References Cited

U.S. PATENT DOCUMENTS 10,507,913 B2 * 12/2019 Chan ....................... H01L 39/02

FOREIGN PATENT DOCUMENTS

| CN | 201580558 U | 9/2010 |
|---|---|---|
| KR | 10-2010-0051289 A | 5/2010 |
| KR | 10-2015-0057364 A | 5/2015 |
| KR | 10-1716430 B1 | 3/2017 |
| KR | 10-2019-0012848 A | 2/2019 |

* cited by examiner

*Primary Examiner* — Emily P Pham
(74) *Attorney, Agent, or Firm* — KORUS Patent, LLC; Seong Il Jeong

(57) ABSTRACT

The present invention provides a driving apparatus of a flight object, the driving apparatus comprising: a support member rotatably installed inside a flight object body; a first rotation actuating part installed on the support member; a second rotation actuating part installed on the first rotation actuating part in a direction intersecting with the first rotation actuating part, and a magnetic body rotating vertically and horizontally by the first and the second rotation actuating part, wherein the magnetic body includes: a hemisphere rotation body installed on the second rotation actuating part; a current body installed inside the hemisphere rotation body and supplied electronic currents; a first pole magnetic body installed in one side of the current body; a second pole magnetic body installed in the other side, and a connection part connecting between the first and the second pole magnetic body.

4 Claims, 5 Drawing Sheets

50

DRIVING APPARATUS OF FLIGHT OBJECT

FIELD OF THE INVENTION

The present invention relates to a driving apparatus of a flight object and more particularly, to a driving apparatus of a flight object that can fly in desired directions by vertically and horizontally rotating a magnetic body that an electronic current is supplied into.

BACKGROUND OF THE INVENTION

In general, land and maritime transportation means have been extensively researched and developed and widely used in real life. However, aerial transportation means have not been developed yet enough to be in practical use.

Recently, flight objects, especially drones, are being researched and developed for small-scale transportations and/or filming purposes. However, there is no proper passenger vehicle which can replace conventional airplanes.

The conventional airplanes use fossil fuel, such as aviation gasoline, which causes environment problems including air pollution. In addition, an engine in the airplane accompanies noise and vibration while it is driven. Accordingly, there is a need for environment-friendly flight objects with low noise.

Various kinds of flight objects have been researched, and there is a flight apparatus as one example of the prior arts.

This flight apparatus comprises: a body part including a lower body having a vertical outflow hole discharging air, which is flowed into the inside from the outside, an upper body located on the top of the lower body, and a lightening part having a magnet and a coil, which lighten the weights of the upper and the lower part by selectively forming repulsive forces, wherein the lightening part is equipped in each of the upper and the lower part, respectively; and a main pan equipped in the lower body of the body part and configured to introduce the outside air into the inside of the body part to form buoyancy, which enables a transportation without using fossil fuel and reduces environment pollution.

However, since the flight apparatus above is configured to introduce an air from the bottom of the lower body by the main pan and then discharge the air, it is difficult to apply it into practical flight. In addition, since the rotation of blades is turned on by power converted from a photovoltaic module, it is hard to drive the flight apparatus during the night time.

Meanwhile, magnetic properties of a magnet have characteristics of pulling a piece of metal or forming impacts on electronic currents. The magnet may be categorized into a temporary magnet and a permanent magnet depending on magnetic properties caused by external magnetic fields.

The temporary magnet can lose its magnetic property when external magnetic fields are removed, such as a metal pin of an electromagnet; on the other hand, the permanent magnet can retain its magnetic property in a long term once it obtains the magnetic property even after the external magnetic field are removed. Magnets can be categorized into a rod magnet, a horseshoe magnet having a U shape, and others depending on their shapes. In addition, a magnetic needle is a small permanent magnet, which can freely rotate in a horizontal plane.

A magnet maintains its magnetic property even though it is cut into two pieces. When each piece is cut into two smaller pieces again, each smaller pieces also retains its magnetic property. Thus, a magnet always has its magnetic property regardless of how many it splits.

An electromagnet is a soft iron core with a coil surrounding the core. Even though the electromagnet is a temporary magnet, which a magnetic force appears only when electronic currents pass through the coil, it can have stronger magnetic forces than the permanent magnet does.

Furthermore, the magnetic force can be adjusted according to the intensity of the electronic current.

For these reasons, the electromagnet is widely used in various areas from a receiver of a telephone to a science field, which requires a strong magnetic field such as a particle accelerator.

These magnets and the electromagnets are widely used in various industries, and related principles are also well known.

Especially, those are fundamental principles of a motor or an electric generator.

In addition, with advancements in technology, a train can be driven in a levitation state using magnetic fields, such as a magnetic levitation train.

Meanwhile, a gliding bird receives a boost from the air, which supports its weight. Likewise, a jumbo jet that flies high in the sky, also receives a force from the air, which supports several hundred tons of its weight.

As described above, buoyancy is a force of a fluid to exert upward on a moving object moving horizontally.

For example, a cross-section of a wing of an airplane has a streamlined shape, which minimizes restriction from the fluid. In this instance, a pressure that the bottom of the wing receives is higher than that of the top, and the wing is pushed up by the difference between these pressures.

Meanwhile, the flight object indicates an object which can fly in the air, such as an airplane, a helicopter, and others.

Theses flight objects can fly in the air using buoyancy by rotation of a propeller, a protrusion force by an engine, and another buoyancy by wings.

Especially, the helicopter can fly vertically using buoyancy, which is generated by the rotation of the propeller.

However, since the conventional propeller rotates by driving the engine, it has a huge size, makes a loud noise, and has high fuel consumption.

For example, the first patent document below discloses a buoyancy-generating flight object using a magnet.

The buoyancy-generating flight object using a magnet according to the first patent document comprises: a main body having a streamlined circle shape, which lowers air resistance, and equipped with a connection part including multiple magnets and electromagnets that are arranged along an outer circumference of the streamlined circle shape; a rotational wing that is equipped on an outer surface of the main body and that includes at least two of wings, each of which has an airplane wing shape, and a rotational part having magnets arranged on an inner circumference thereof corresponding to the connection part, wherein the connection part of the main body has a T shape or a C shape, and the rotational part of the rotational wing has a C shape or a T shape corresponding to the connection part.

The electromagnets are arranged to form a circle band layout in a center of the connection part of the main body, and the permanent magnets are arranged to form a circle band layout or an equal space layout on a top and a bottom of the connection part. The main body comprises a generating part including a generator producing power and a battery; a supplying part receiving power from the generating part and supplying the power to the electromagnet of the connecting part; a controlling part controlling the generating part and the supplying part; a generating mean that can generate energy while the rotational wing rotates; and a charging part charging electricity generated from the generating mean.

When the rotational wing is driven, some of the electromagnets can be not supplied by currents and the coils can generate electricity by the permanent magnets arranged by equal spaces. The rotational part of the rotational wing is connected corresponding to the connecting part of the main part with a certain spaced distance. Accordingly, the rotational part can maintain a balance by pushing and pulling of magnetic forces of the permanent magnets, thereby rotatably fixing the rotational wing without friction.

The second patent document discloses a flight object.

According to the second patent document, the flight object comprises an outer body having a ring shape, which includes some portions of a lateral side and a center side of an outer circumference with penetrations along the circumferences; a blade part including at least one of blade and installed to be able to rotate inside the outer body, and moving air from the lateral side into the center side of the outer circumference; a first magnetic mean including magnetic bodies formed in the outer body and the blade part, respectively, and allowing the blade part in a levitation state with a gap from the outer body by a magnetic force; a second magnetic mean including an electromagnet formed in the outer body and a magnetic body formed in the blade part and allowing the blade part to rotate by a magnetic force; and a steering part configured to be surrounded by the center side of the outer body, to be arranged along an outer circumference of a center body, which includes a controlling part controlling an operation of rotation of the blade part and operation of the steering part and a power supplying part supplying part to the controlling part and the electromagnet, and to discharge the air, which is moved to the center side of the outer body by the blade part, upward or downward.

PRIOR ART DOCUMENTS (Patent Document 0001) Korean Application Publication No. 10-2015-0057364
(Patent Document 0002) Korean Patent Registration No. 10-1716430
(Patent Document 0003) Korean Application Publication No. 10-2015-0057364

Technical Problem

One object of the invention is to provide a driving apparatus of a flight object driven by forces generated according to directions of the electronic currents supplied to the magnetic body.

Another object of the invention is to provide a driving apparatus of a flight object that can control directions of the forces generated by electronic currents by vertically and horizontally rotating the magnetic body, which is supplied the electronic currents.

SUMMARY OF THE INVENTION

The present invention provides a driving apparatus of a flight object including a flight object body 10 having a streamlined shape that reduces air resistance, the driving apparatus comprising: a support member 20 rotatably installed inside the flight object body 10; a first rotation actuating part 30 installed on the support member 20 in one direction; a second rotation actuating part 40 installed on the first rotation actuating part 30 in another direction intersecting with the direction of the first rotation actuating part 30, and a magnetic body 50 rotating vertically and horizontally by the first rotation actuating part 30 and the second rotation actuating part 40, wherein the magnetic body 50 includes: a hemisphere rotation body 51 installed on a top part of the second rotation actuating part 40; a current body 52 installed inside the hemisphere rotation body 51 and supplied electronic currents; a first pole magnetic body 53 installed in one side of the current body 52 with regard to the current body 52; a second pole magnetic body 54 installed in the other side of the current body 52 with regard to the current body 52; and a connection part 55 connecting between the first pole magnetic body 53 and the second pole magnetic body 54.

The first rotation actuating part 30 is rotatably installed with regard to the support member 20, wherein the second rotation actuating part 40 is rotatably installed with regard to the first rotation actuating part 30, wherein the first rotation actuating part 30 and the second rotation actuating part 40 are installed in intersecting directions to each other to allow the magnetic body 50 to rotate vertically and horizontally.

The first rotation actuating part 30 comprises: a first rotation axis 31 rotatably installed on the support member 20; a first rotation motor 32 installed on one side of the first rotation axis 31 to rotate the first rotation axis 31, and the hemisphere rotation body 35 connected to the first rotation axis 31, thereby enabling the second rotation actuating part 40 to rotate.

The first rotation actuating part 30 rotates by the first rotation motor 32, in a reciprocating motion with a 180 degree angle with regard to the support member 20.

The second rotation actuating part 40 comprises: the hemisphere rotation body 35 rotatably installed on the first rotation actuating part 30; a second rotation axis 41 rotatably installed on the hemisphere rotation body 35, and a second rotation motor 42 installed on one side of the second rotation axis 41 to rotate the second rotation axis 41.

The second rotation actuating part 40 rotates by the second rotation motor 42, in a reciprocating motion with a 180 degree angle with regard to the first rotation actuating part 30.

The magnetic body 50 comprises a hemisphere rotation body 51 installed on a top part of the second rotation actuating part 40; a current body 52 installed inside the hemisphere rotation body 51 and supplied electronic currents; a first pole magnetic body 53 installed in one side of the current body 52 with regard to the current body 52; a second pole magnetic body 54 installed in the other side of the current body 52 with regard to the current body 52; and a connection part 55 connecting between the first pole magnetic body 53 and the second pole magnetic body 54.

Technical Effects

As described above, according to a driving apparatus of a flight object of the present invention, the first rotation actuating part 30 can rotate with regard to the supporting member, and the second rotation actuating part 40 can rotate with regard to the first rotation actuating part 30. Accordingly, the magnetic body can rotate in desired directions and angles by these rotation actuating parts.

In addition, according to a driving apparatus of a flight object of the present invention, a force can be generated by supplying electronic currents to the magnetic body, thereby enabling the flight object to fly in desired directions and angles.

DETAILED DESCRIPTION EMBODIMENTS OF THE INVENTIONS

Figure 1:
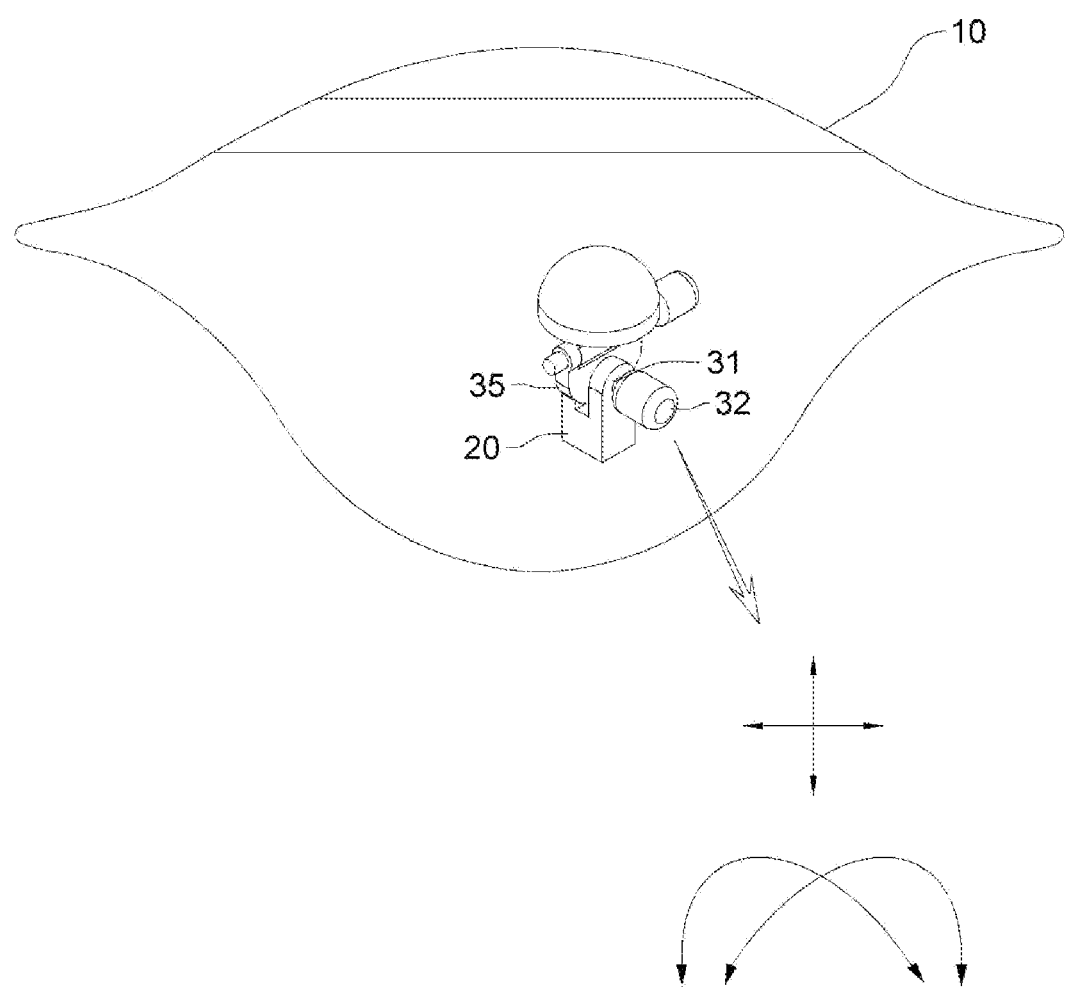
FIG. 1 is a schematic three dimensional view of a driving apparatus of a flight object according to a preferred embodiment of the present invention.

Hereinafter, embodiments of the present invention will be described in detail in conjunction with the accompanying drawings.

Since the descriptions are regarding embodiments to illustrate structures or functions of the invention, the scope of the invention should not be construed to be restricted or limited within the embodiments mentioned below.

Specifically, since the embodiments can be variously modified and have a variety of types, the scope of the present invention should be construed to include the equivalents of the embodiments.

In addition, since the purposes and the technical effects suggested in the descriptions do not mean that all of those should be included in a certain embodiment or only those should be included in the embodiments, the scope of the present invention should not be construed to be restricted or limited within these purposes and technical effects.

It should be apparent to those skilled in the art that the following descriptions of exemplary embodiments of the present invention is provided for illustration purpose only and not for the purpose of limiting the invention as defined by the appended claims and their equivalents.

Accordingly, in some embodiments, detailed explanation regarding related components, functions, and technologies, which are well known to one of ordinary skill in the art, will be omitted in case it may obscure the gist of the present invention.

Hereinafter, preferred embodiments of the invention will be described in detail in conjunction with the accompanying drawings.

According to preferred embodiment of a driving apparatus of a flight object including a flight object body 10 having a streamlined shape, which reduces air resistance, of the present invention, the driving apparatus comprises: a support member 20 rotatably installed inside the flight object body 10; a first rotation actuating part 30 installed on the support member 20 in one direction; a second rotation actuating part 40 installed on the first rotation actuating part 30 in another direction intersecting with the direction of the first rotation actuating part 30; a magnetic body 50 rotating vertically and horizontally by the first rotation actuating part 30 and the second rotation actuating part 40.

Figure 2:
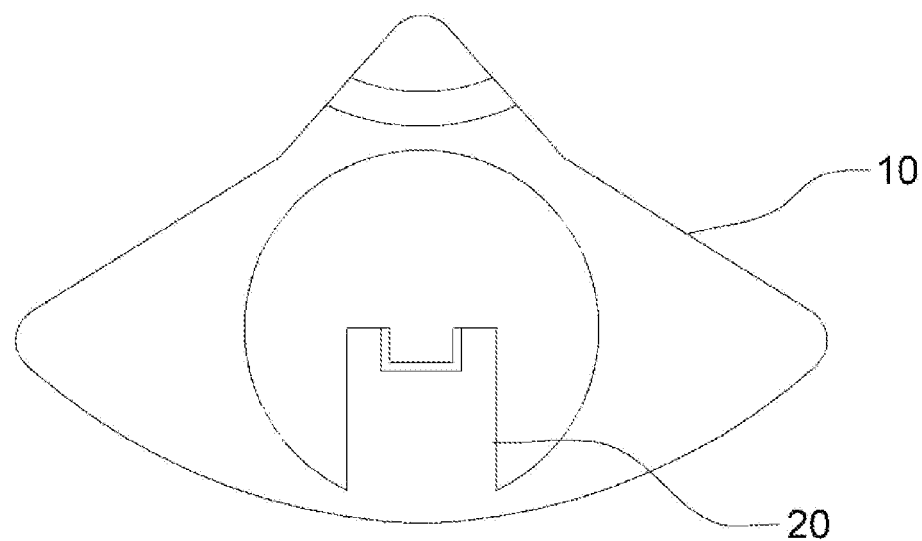
FIG. 2 is a schematic front view of a driving apparatus of a flight object according to a preferred embodiment of the present invention.
Figure 3:
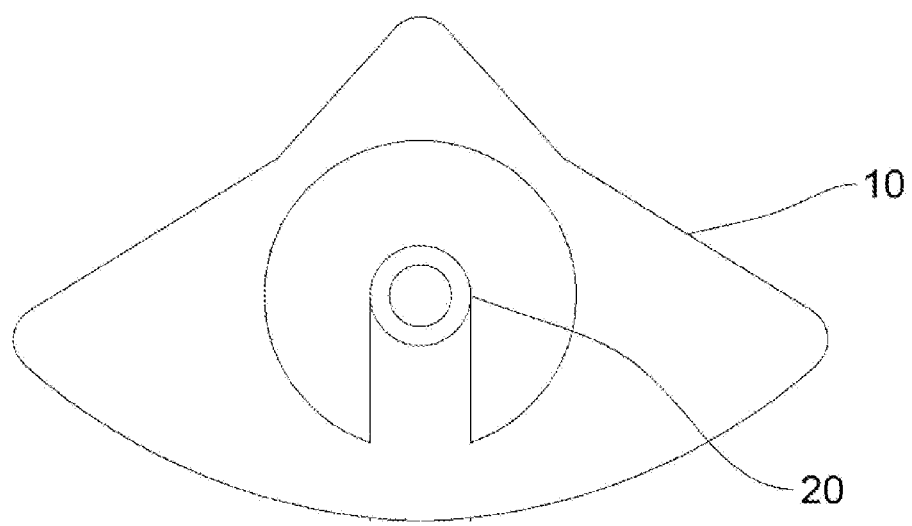
FIG. 3 is a schematic side view of a driving apparatus of a flight object according to a preferred embodiment of the present invention.

FIG. 1 is a schematic three dimensional view of a driving apparatus of a flight object according to a preferred embodiment of the present invention. FIG. 2 is a schematic front view of a driving apparatus of a flight object according to a preferred embodiment of the present invention. FIG. 3 is a schematic side view of a driving apparatus of a flight object according to a preferred embodiment of the present invention.

As illustrated in FIGS. 1 to 3, the driving apparatus of the flight object is installed inside the flight object body 10 and generates a force that the flight object body 10 can fly.

The flight object body 10 is the general term for objects that can fly in the air, such as an airplane, a drone, and others. The magnetic body 50 is installed inside the flight object body 10 to enable the flight object body 10 to fly by applied electronic currents.

Figure 4:
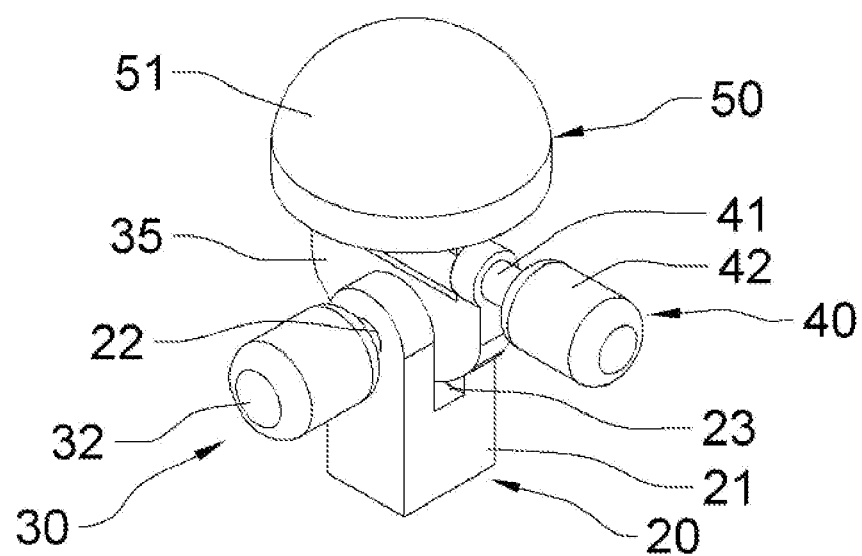
FIG. 4 is a three dimensional view of a driving apparatus of a flight object according to a preferred embodiment of the present invention.
Figure 5:
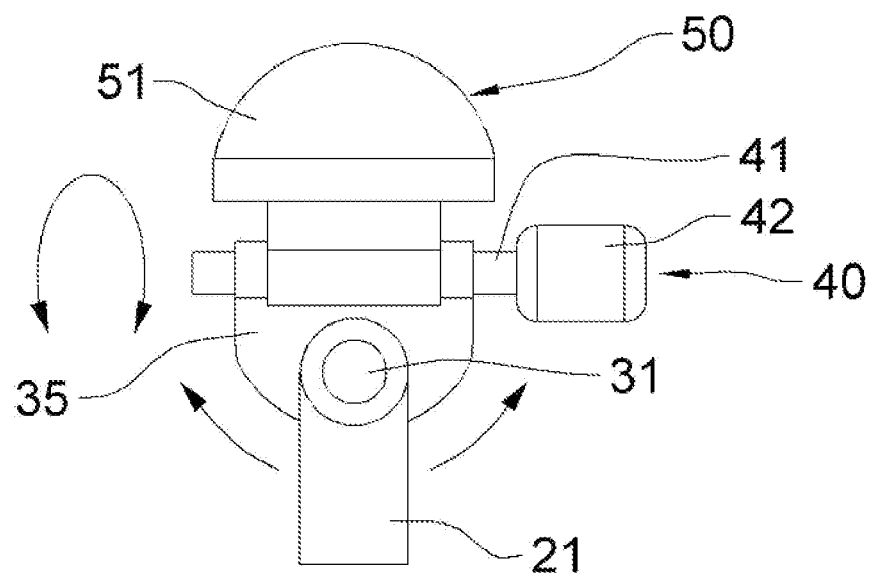
FIG. 5 is a front view of a driving apparatus of a flight object according to a preferred embodiment of the present invention.
Figure 6:
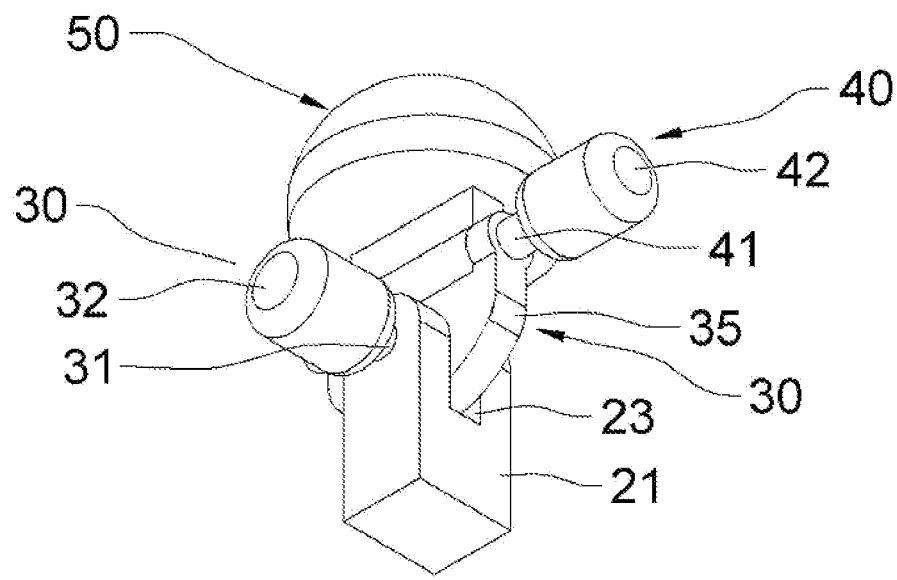
FIG. 6 is a three dimensional bottom view of a driving apparatus of a flight object according to a preferred embodiment of the present invention.

FIG. 4 is a three dimensional view of a driving apparatus of a flight object according to a preferred embodiment of the present invention. FIG. 5 is a front view of a driving apparatus of a flight object according to a preferred embodiment of the present invention. FIG. 6 is a three dimensional bottom view of a driving apparatus of a flight object according to a preferred embodiment of the present invention.

The support member 20 is installed to support the driving apparatus to be stably installed on the flight object 10.

The support member 20 may be installed in any part inside the flight object body 10, such as a rear part or a center part inside the flight object body 10.

The driving apparatus comprises: the support member 20; the first rotation actuating part 30 rotatably installed on the support member 20; the second rotation actuating part 40 installed on the first rotation actuating part 30 in a direction intersecting with a direction of the first rotation actuating part 30; and a magnetic body 50 a force direction of which is adjusted by the first rotation actuating part 30 and the second rotation actuating part 40 and rotates vertically and horizontally by the first rotation actuating part 30 and the second rotation actuating part 40.

The support member 20 comprises: a body 21 having a certain height; a connection hole 22 formed to install the first rotation actuating part 30 on a top part of the body 21; and a rotation space part 23 formed to install the first rotation actuating part 30 to be rotatable.

The connection hole 22 is formed in a top part of the body 21 to allow the first rotation actuating part 30 to be rotatably installed. The rotation space part 23 is formed in a top part of the body 21 to allow the first rotation actuating part 30 to rotate.

Thus, the rotation space part 23 is formed to have a U shape cross section. A hemisphere rotational body 35 of the first rotation actuating part 30 is rotatably installed in the rotation space part 23.

Meanwhile, the first rotation actuating part 30 is rotatably installed on the support member 20, the second rotation actuating part 40 is rotatably installed on the first rotation actuating part 30, and the first rotation actuating part 30 and the second rotation actuating part 40 are installed in intersecting directions to each other to allow the magnetic body 50 to rotate vertically and horizontally.

The first rotation actuating part 30 is installed in a direction intersecting with a direction of the support member 20, and the second rotation actuating part 40 is installed in a direction intersecting with the direction of the first rotation actuating part 30.

As illustrated in FIG. 1, the first rotation actuating part rotates in a horizontal direction, and the second rotation actuating part 40 rotates in a vertical direction.

In addition, the first rotation actuating part 30 rotates in a reciprocating motion within a 180 degree angle, and the second rotation actuating part 40 rotates in a reciprocating motion within a 180 degree angle.

As illustrated in FIGS. 2 to 4, the first rotation actuating part 30 is rotatably installed in the connecting hole 22 of the support member 20.

The first rotation actuating part 30 comprises a first rotation axis 31 rotatably installed on the support member 20; a first rotation motor 32 installed on one side of the first rotation axis 31 to rotate the first rotation axis 31; and the hemisphere rotation body 35 connected to the first rotation axis 31 and enabling the second rotation actuating part 40 to rotate, wherein the first rotation actuating part 30 rotates by the first rotation motor 32, in a reciprocating motion within a 180 degree angle with regard to the support member 20.

The first rotation axis 31 of the first rotation actuating part 30 is rotatably connected to the connection hole 22, and the first rotation motor 32 is installed on one end of the first rotation axis 31.

In addition, the hemisphere rotation body 35 having an approximately semicircle shape is installed on the first rotation axis 31, and the hemisphere rotation body 35 rotates by the first rotation axis 31, in a reciprocating motion within a 180 degree angle.

The second rotation actuating part 40 is installed on a top part of the hemisphere rotation body 35.

The second rotation actuating part 40 comprises the hemisphere rotation body 35 rotatably installed on the first rotation actuating part 30; a second rotation axis 41 rotatably installed on the hemisphere rotation body 35; a second rotation motor 42 installed on one side of the second rotation axis 41 to rotate the second rotation axis 41, wherein the second rotation actuating part 40 rotates by the second rotation motor 42, in a reciprocating motion within a 180 degree angle with regard to the first rotation actuating part 30.

The second rotation axis 41 of the second rotation actuating part 40 is rotatably connected to the hemisphere rotation body 35, and the second rotation motor 42 is installed on one end of the second rotation axis 41.

In addition, the magnetic body 50 is installed on a top part of the second rotation actuating part 40.

Figure 7:
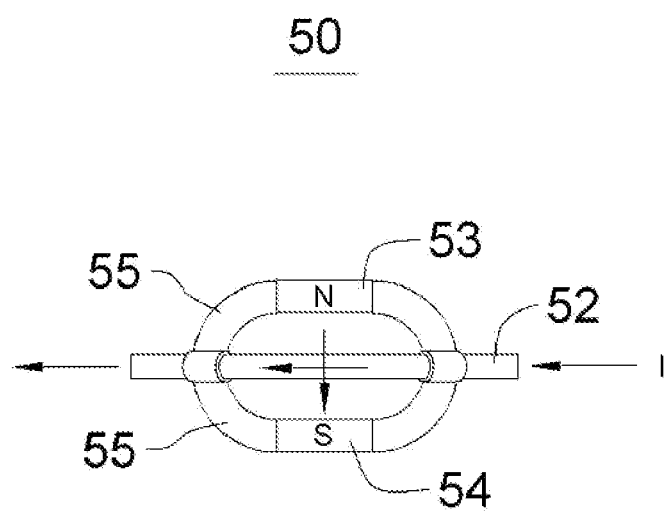
FIG. 7 is a top view of a magnetic body installed in a driving apparatus of a flight object according to a preferred embodiment of the present invention.
Figure 8:
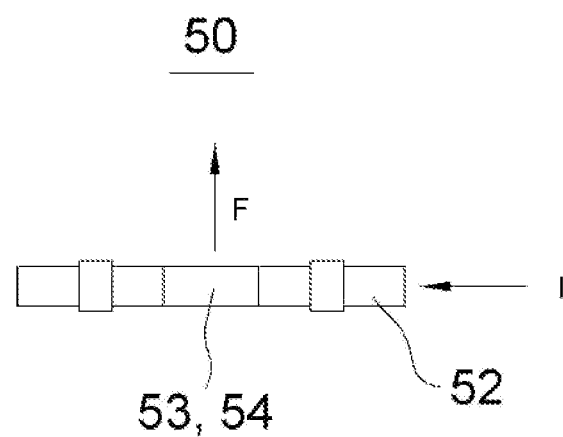
FIG. 8 is a front view of a magnetic body installed in a driving apparatus of a flight object according to a preferred embodiment of the present invention.
Figure 9:
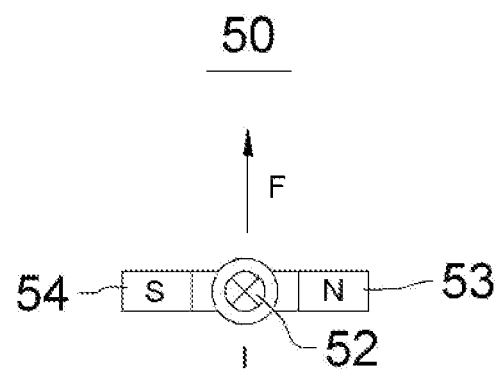
FIG. 9 is a side view of a magnetic body installed in a driving apparatus of a flight object according to a preferred embodiment of the present invention.

FIG. 7 is a top view of a magnetic body installed in a driving apparatus of a flight object according to a preferred embodiment of the present invention. FIG. 8 is a front view of a magnetic body installed in a driving apparatus of a flight object according to a preferred embodiment of the present invention. FIG. 9 is a side view of a magnetic body installed in a driving apparatus of a flight object according to a preferred embodiment of the present invention.

The magnetic body 50 comprises a hemisphere rotation body 51 installed on a top part of the second rotation actuating part 40; a current body 52 installed inside the hemisphere rotation body 51 and supplied electronic currents; a first pole magnetic body 53 installed in one side of the current body 52 with regard to the current body 52; a second pole magnetic body 54 installed in the other side of the current body 52 with regard to the current body 52; and a connection part 55 connecting between the first pole magnetic body 53 and the second pole magnetic body 54.

As illustrated in FIGS. 7 to 9, a driving apparatus of a flight object according to embodiments of the present invention comprises the hemisphere rotation body 51 having a hemisphere shape, and the magnetic body installed inside the hemisphere rotation body 51.

Specifically, the hemisphere rotation body 51 is hollow inside, and the current body 52 is installed inside the hemisphere rotation body 51.

The current body 52 has a flat shape, and the first pole magnetic body 53 is installed in one side of the current body 52 while the second pole magnetic body 54 is installed in the other side of the current body 52.

The first pole magnetic body 53 is N-pole, and the second pole magnetic body 54 is S-pole.

Meanwhile, the connection part 55 connects between the first pole magnetic body 53 and the second pole magnetic body 54 to stably maintain the first pole magnetic body 53 and the second pole magnetic body 54 in the installed state.

Hereafter, connection relations in a driving apparatus of a flight object according to preferred embodiments of the present invention will be described.

As illustrated in FIGS. 1 to 9, a driving apparatus of a flight object according to an embodiment of the present invention can fly in desired directions by rotating the magnetic body 50 using vertical and horizontal rotations of the first rotation actuating part 30 and the second rotation actuating part 40 inside the flight object body 10.

The driving apparatus is installed inside the flight object body 10. The driving apparatus is configured that the first rotation actuating part 30 and the second rotation actuating part are rotatably installed on the support member 20. In this instance, the first rotation actuating part 30 and the second rotation actuating part 40 are installed to rotate in intersecting directions to each other.

The first rotation actuating part 30 and the second rotation actuating part 40 allow the flight object to fly by forces generated by electronic currents according to vertical and horizontal rotations of the magnetic body 50 installed on the first rotation actuating part 30 and the second rotation actuating part 40.

The support member 20 is installed inside the flight object body 10, and the first rotation axis 31 of the first rotation actuating part 30 is rotatably installed on the rotation space part 23 of the support member 20.

As illustrated in FIGS. 4 to 6, the first rotation axis 31 rotates by the first rotation motor 32 installed in one side of the first rotation axis 31, and the first rotation actuating part 30 is rotatably installed on the support member 20 in a direction intersecting with the support member 20 and rotates by the first rotation motor 32.

The second rotation actuating part 40 is installed on the top part of the first rotation actuating part 30, and the second rotation actuating part 40 is installed in a direction intersecting with the first rotation actuating part 30.

This connection relation allows the magnetic body 50 installed on the top part of the second rotation actuating part 40 to rotate vertically and horizontally.

Accordingly, the first rotation actuating part 30 and the second rotation actuating part 40 can rotate the magnetic body 50 in desired directions, thereby adjusting directions of the force generated by electronic currents supplied to the magnetic body 50.

Meanwhile, the first rotation actuating part 30 is rotatably installed within 180 degree angle with regard to the support member 20, and the second rotation actuating part 40 is rotatably installed within 180 degree angle with regard to the first rotation actuating part 30.

Accordingly, the magnetic body 50 can freely rotate vertically and horizontally by the first rotation actuating part 30 and the second rotation actuating part 40, and freely rotate within 180 degree angles by the first rotation axis 31 and the second rotation axis 41.

As illustrated in FIG. 1, since the magnetic body 50 can rotate with regard to each rotation axis 31, 41 as well as vertical and horizontal rotations, the magnetic body 50 can freely rotate within an imaginary hemisphere shape with regard to an imaginary horizontal plane.

As illustrated in FIGS. 7 to 9, the magnetic body 50 comprises the current body 52 which electronic currents flow through and installed inside the battery (not shown). The first pole magnetic body 53 is installed in one side of the current body 52, and the second pole magnetic body 54 is installed in the other side of the current body 52.

When an electronic current supplied into the battery flows through the current body 52, a force F is generated based on a direction of the electronic current according to Fleming's right-hand law.

The magnetic body 50 can rotate vertically and horizontally by the first rotation actuating part 30 and the second rotation actuating part 40, and can rotate within an imaginary hemisphere shape with regard to an imaginary horizontal plane.

Accordingly, the flight object body 10 can fly in desired directions by the forces generated according to the current body 52.

While embodiments of the present invention have been described, the present invention is not limited to what has been particularly shown. It would be apparent that many more modifications and variations than mentioned above are possible by an ordinary person skilled in the art.

What is claimed is:

1. A driving apparatus of a flight object including a flight object body having a streamlined shape that reduces air resistance, the driving apparatus comprising:
    a support member rotatably installed inside the flight object body;
    a first rotation actuating part installed on the support member in one direction;
    a second rotation actuating part installed on the first rotation actuating part in another direction intersecting with the direction of the first rotation actuating part, and
    a magnetic body rotating vertically and horizontally by the first rotation actuating part and the second rotation actuating part,
    wherein the magnetic body includes:
        a hemisphere rotation body installed on a top part of the second rotation actuating part;
        a current body installed inside the hemisphere rotation body and supplied electronic currents;
        a first pole magnetic body installed in one side of the current body with regard to the current body;
        a second pole magnetic body installed in the other side of the current body with regard to the current body, and
        a connection part connecting between the first pole magnetic body and the second pole magnetic body.

2. The driving apparatus of claim 1, wherein the first rotation actuating part is rotatably installed with regard to the support member,
    wherein the second rotation actuating part is rotatably installed with regard to the first rotation actuating part,
    wherein the first rotation actuating part and the second rotation actuating part are installed in intersecting directions to each other to allow the magnetic body to rotate vertically and horizontally.

3. The driving apparatus of claim 1, wherein the first rotation actuating part comprises:
    a first rotation axis rotatably installed on the support member;
    a first rotation motor installed on one side of the first rotation axis to rotate the first rotation axis, and
    the hemisphere rotation body connected to the first rotation axis and enabling the second rotation actuating part to rotate,
    wherein the first rotation actuating part rotates by the first rotation motor, in a reciprocating motion within a 180 degree angle with regard to the support member.

4. The driving apparatus of claim 1, wherein the second rotation actuating part comprises:
    the hemisphere rotation body rotatably installed on the first rotation actuating part;
    a second rotation axis rotatably installed on the hemisphere rotation body, and a second rotation motor installed on one side of the second rotation axis to rotate the second rotation axis,
    wherein the second rotation actuating part rotates by the second rotation motor, in a reciprocating motion within a 180 degree angle with regard to the first rotation actuating part.

* * * * *